United States Patent [19]

Hammes et al.

[11] 4,177,934
[45] Dec. 11, 1979

[54] CONTAINER AND LID

[75] Inventors: Theo Hammes, Cologne; Alois Hoff, Brühl, both of Fed. Rep. of Germany

[73] Assignee: Mauser Kommandit-Gesellschaft, Brühl, Fed. Rep. of Germany

[21] Appl. No.: 913,032

[22] Filed: Jun. 7, 1978

Related U.S. Application Data

[63] Continuation of Ser. No. 701,870, Jul. 1, 1976, abandoned.

[30] Foreign Application Priority Data

Oct. 4, 1975 [DE] Fed. Rep. of Germany ....... 2544491

[51] Int. Cl.² .................... B65D 45/32; B65D 43/06; B65D 7/42
[52] U.S. Cl. .................... 220/319; 220/320; 220/355; 220/72; 215/275
[58] Field of Search .............. 220/319, 320, 321, 355, 220/72, 74; 215/275

[56] References Cited

U.S. PATENT DOCUMENTS

| | | | |
|---|---|---|---|
| 2,801,764 | 8/1957 | Russell et al. | 220/320 |
| 3,062,401 | 11/1962 | Needham | 220/320 |
| 3,510,023 | 5/1970 | Ullman et al. | 220/320 X |
| 3,516,571 | 6/1970 | Roper et al. | 220/74 X |
| 3,696,962 | 10/1972 | Fehres | 220/319 |
| 3,792,797 | 2/1974 | Mrusek et al. | 220/319 X |
| 3,851,788 | 12/1974 | Hammes | 220/319 |
| 3,942,677 | 3/1976 | Hagen et al. | 220/304 |

Primary Examiner—Steven M. Pollard
Attorney, Agent, or Firm—Michael J. Striker

[57] ABSTRACT

A container which has a body portion, a neck portion and a radially outwardly extending flange intermediate and integral with the body and neck portions is blow-molded in a mold which has at least two mold elements one of which is mounted on the other for displacement in the axial direction of the mold. The mold elements have chambers which substantially conform in shape to those of the body and the neck portions of the container, the mold elements together defining an annular recess in which an intermediate portion is formed during the blow-molding operation, such portion having a pair of radially outwardly extending sections, and a connecting section extending between radially outward marginal portions of the radial sections. After the blow-molding operation, while the material in the mold is still in a flowable state, the mold sections are displaced relative to one another to press the radial sections toward and against one another to fuse the same into a unitary flange having an axial thickness substantially twice that of the neck and body portions. A lid of the container has an external wall which surrounds the neck portion and has an additional flange, and a ring-shaped connecting element urges the flange and the additional flange toward one another in the axial direction of the container to sealingly contact a sealing ring with the lid and the neck portion, respectively.

6 Claims, 3 Drawing Figures

CONTAINER AND LID

This is a continuation, of application Ser. No. 701,870, filed July 1, 1976, now abandoned.

BACKGROUND OF THE INVENTION

The present invention relates to containers in general, and more particularly to barrel-shaped containers of synthetic plastic material.

Barrel-shaped containers of synthetic plastic material are already known and they are finding ever-increasing use in various fields of human endeavour, such as for storing beverages and other liquids or flowable materials. Such containers are very inexpensive, particularly when produced by a blow-molding process, and they do not adversely affect the liquids contained therein. In addition thereto, such containers have a much smaller weight than conventional barrels for the same capacity, while being capable of withstanding internal and external forces to which the such barrels are subjected during storage, handling and use. However, experience with containers of this type has shown that they are still possessed of certain drawbacks which prevented such containers from even more extensive use.

Owing to the peculiar qualities of the blow-molding process, the conventional containers of this type have been formed with an annular projection of a generally U-shaped axial section, to which projection a radial outward flange of a lid of a container was connected by means of a ring-shaped element urging the flange towards the radial projection. The formation of such radial projection was heretofore necessary in order to assure that the material being blow-molded fully penetrates into a recess in the mold usd for the blow-molding process.

In one of the conventional containers of this type, the radial projection was formed between the body portion and the neck portion of the container, and represented a region of weakness in the container, having a particularly low resistance to axial forces transmitted from the neck portion to the body portion or vice versa. While this may not have been crucial for many uses of such conventional containers, it was a very serious drawback when a plurality of such containers had to be stacked on top of one another. Under these circumstances, the weight of the superimposed containers acted on the lower containers, and particularly on the lids thereof, from which it was transmitted to the neck portions of the lower containers and from there to the radial projections. These latter projections then acted as deformable folds so that, when the weight of the upper containers was radially offset from the central axis of the lower containers, the radial projection deformed more at some regions of the container than at others, thus presenting the danger that the entire stack of superimposed containers may have tilted over. In addition to endangering the personnel handling such containers, the tilting over of the stack and the subsequent impact of the upper containers upon the floor of the storage space brought about the danger of substantial damage to the impacted containers, and in particular disassociation of the lids from the remainders of the containers and thus spilling of the contents of such containers.

To remedy this situation it has already been proposed to form the radial projection with a plurality of indentations equidistantly spaced about the periphery of the radial projection, the presence of such indentations resulting in a substantial stiffening of the radial projections, whereby the adverse effects of the deformable fold have been almost entirely eliminated and the axially oriented forces were transmitted between the neck portion and the body portion directly and in a gradual and almost uniform manner.

An important disadvantage of this solution to the outstanding problem is that the indentations cannot be made arbitrarily deep in order to improve the axial stiffness of the radial projection. Another drawback of this solution is that the radial stiffness of the radial projection is reduced by the presence of such indentations. Therefore, it was necessary to stabilize the radial projection by addition of material in the radial direction.

Another important disadvantage of the containers which have been described above is that the conventional containers had annular recesses within the radial projections, in which recesses deposits from the fluids accommodated within such containers tended to form which it was difficult if not impossible to remove when cleaning the containers for further use.

SUMMARY OF THE INVENTION

Accordingly, it is a general object of the present invention to avoid the disadvantages of the prior-art containers.

More particularly, it is an object of the present invention to provide a container of synthetic plastic material which is simple in construction and reliable in operation.

An additional object of the present invention is to provide a container which has a radial flange intermediate the neck portion and the body portion of the container which flange rididly connects such portions with one another.

A concomitant object of the present invention is to provide a method of manufacturing such a container in a simple and inexpensive manner.

A still another object of the present invention is to device a mold for performing the abovementioned method.

In pursuance of these objects and others which will become apparent hereinafter, one feature of the present invention resides, briefly stated, in a container which comprises a body portion that has an axis of symmetry; a neck portion which is coaxial with the body portion and axially spaced therefrom, the neck portion having a predetermined wall thickness; and an outwardly extending circumferential flange located intermediate and being integral with the body portion and the neck portion, the flange having an axial thickness which is substantially twice that of the neck portion. The container may further comprise a lid which includes an external wall which surrounds the neck portion when the container is closed, the external wall having an additional circumferential flange axially juxtaposed with the above-mentioned flange in the closed position, and an annular connecting element which is arranged to embrace the flange and the additional flange and to urge the additional flange of the lid toward the flange of the container axially of the container.

In a currently preferred embodiment of the present invention, a lower surface of the flange of the lid abuts an upper surface of the above-mentioned flange of the container at least when a force, for instance, resulting from stacking a plurality of containers on top of one another, is applied to the lid.

The neck portion may have an undulated configuration in the axial direction of the container, and the lid may have an internal wall adapted to be received within the neck portion, and a transverse wall extending substantially normal to the internal and external walls of the lid and interconnecting the same to form an annular channel therewith. An annular sealing element is received in the channel which sealingly contacts the neck portion and the lid in the closed position to seal the interface between the neck portion and the lid. Advantageously, the sealing element contacts an upper end face of the neck portion, the upper end face being corrugated.

According to a further aspect of the present invention, a method of manufacturing a container of the above-mentioned type comprises the steps of blow-molding a container preform with at least the body portion, the neck portion and an intermediate portion which has a pair of substantially radial outwardly projecting sections integral with the body portion and the neck portion, respectively, and a connecting section which extends substantially axially between the projecting sections at the outer marginal portions thereof, and the method further comprising the steps of pressing the projecting portions axially toward one another to thereby deform the sections into an unitary flange of a container. The blow-molding is performed with a blank of a flowable material, and the pressing step is advantageously performed while the material of the preform is still in the flowable state to obtain fusion of the sections with one another to form a flange of a solid cross section. The thus obtained container may then be subjected to a step of trimming for subsequent use.

A further feature of the present invention resides in a mold for forming the above-mentioned container using the method of the present invention, the mold comprising a first mold element having a central axis and a first chamber of a shape generally corresponding to that of the body portion, and a first radial shoulder; and a second mold element which is coaxial with the first mold element and which has a second chamber of a shape generally corresponding to that of the neck portion, and a second radial shoulder, one of the mold elements having an axial wall extending between the first and second radial shoulders and defining therewith an annular recess intermediate the first and second chambers, whereby the flowable material of the blank which is blow-molded in the mold conforms to the shape of the first and second chambers and of the recess to form a pair of substantially radially outwardly projecting sections and a connecting section in the recess, one of the mold elements being mounted on the other for axial displacement relative thereto to thereby decrease the axial width of the recess subsequent to the blow-molding operation and press the projecting sections axially toward one another until a unitary flange is obtained.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawings.

DETAILED DISCUSSION OF THE PREFERRED EMBODIMENTS

Figure 1:
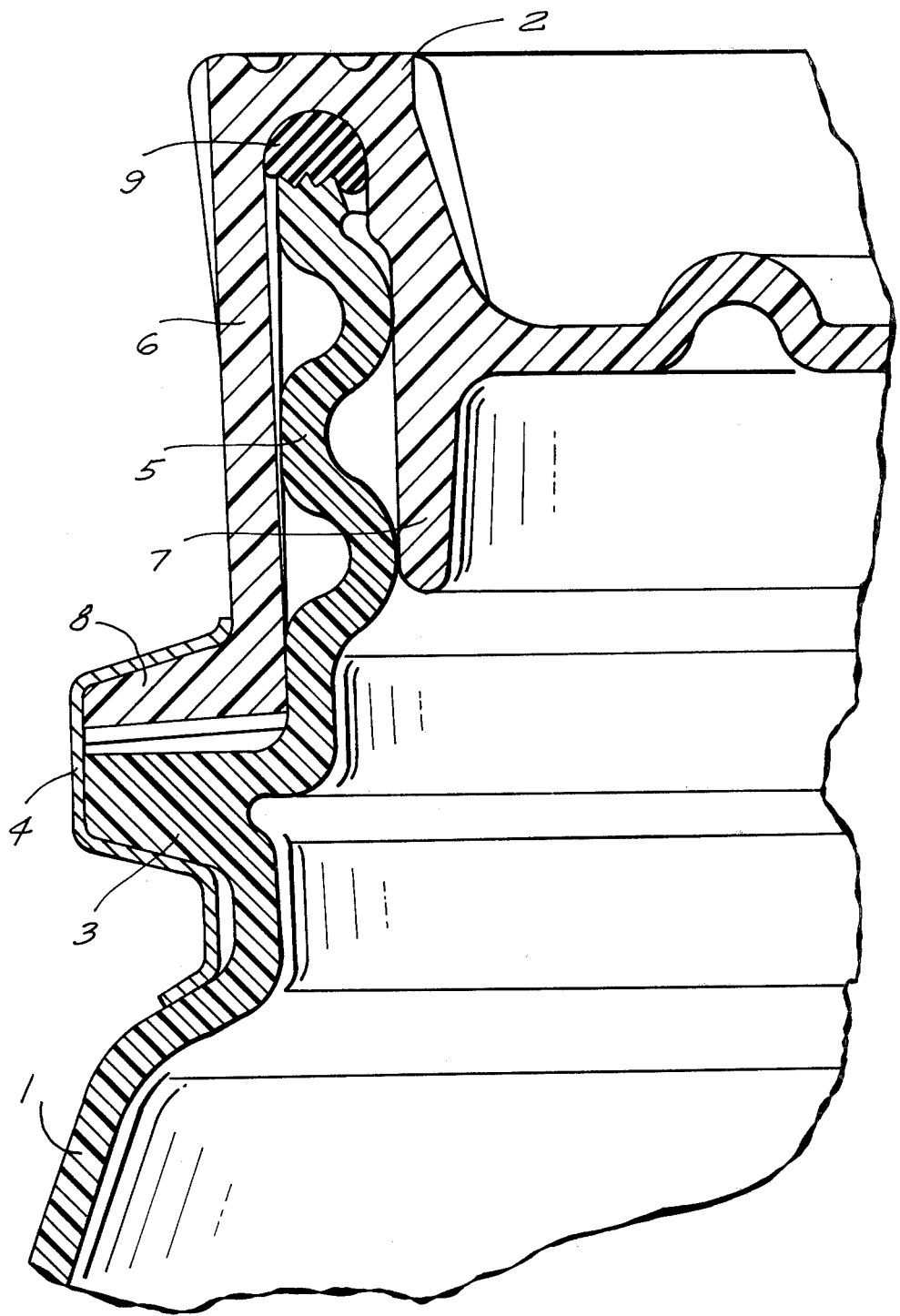
FIG. 1 is a fragmentary sectional view of the container of the present invention.

Referring now to the drawing in detail, and first to FIG. 1, it may be seen that the container includes a body portion 1 which, in the illustrated embodiment, gradually converges in the upward direction to terminate in a substantially upright section. A radially outwardly extending flange 3 merges and is integral with the upright section of the body portion 1, and a neck portion 5 also merges and is integral with the flange 3. As illustrated in FIG. 1, the neck portion 5 may be of an undulated cross-sectional shape when considered in the axial direction of the container. A lid 2 is pressed upon the neck portion 5, the lid 2 having an external wall 6 which surrounds the neck portion 5, the external wall 6 having a flange 8 that extends in the radially outward direction of the container. A ring-shaped connecting element 4 connects the flanges 3 and 8 with one another and urges one toward the other in the axial direction of the container. The lid 2 further comprises an inner wall 7 which defines with the external wall 6 a recess in which a sealing ring 9 is received. The internal wall 7 of the lid 2 is received within the confines of the neck portion 5 so that the neck portion 5 is radially confined between the external wall 6 and the internal wall 7 of the lid 2, a free end face, which may be corrugated, cooperating with the sealing ring 9 to prevent leakage through the interface between the neck portion 5 and the lid 2.

The flange 3 has an axial thickness which is substantially twice that of the body portion 1 or the neck portion 5, the flange 3 also having an upper surface against which a lower surface of the flange 8 may abut at least when axially directed forces act upon the lid 2. Such situation may arise when a number of similar containers is piled upon one another to form a stack. The abutment of the flange 8 against the flange 3 under these circumstances, together with the substantial thickness of the flange 3, prevent substantial deformation of the lower containers by the upper containers, and particularly avoid the tilting of the stack of superimposed containers.

The container of the present invention is preferably obtained by a blow-molding procedure which will now be discussed in connection with FIGS. 2 and 3 which illustrate various stages of manufacture of the container. The blow-molding operation itself is well-known and requires no detailed discussion. Suffice it to say that a blank is introduced into a mold and then an expanding medium at superatmospheric pressure is introduced into the blank, or the mold is evacuated, or both so that the material of the blank eventually conforms to the contour of the mold. As may be seen in FIGS. 2 and 3, the mold consists of at least two mold elements 10 and 11 which are mounted on one another for displacement in the axial direction of the mold and of the container to be formed therein. The mold element 10 defines a chamber which conforms in shape to that of the body portion 1, while the mold element 11 defines a chamber of a shape conforming to that of the neck portion to be formed therein. Each of the mold elements 10 and 11 has a substantially radial shoulder, and the mold element 10 has an axial surface which defines an annular recess with the two shoulders.

Figure 2:
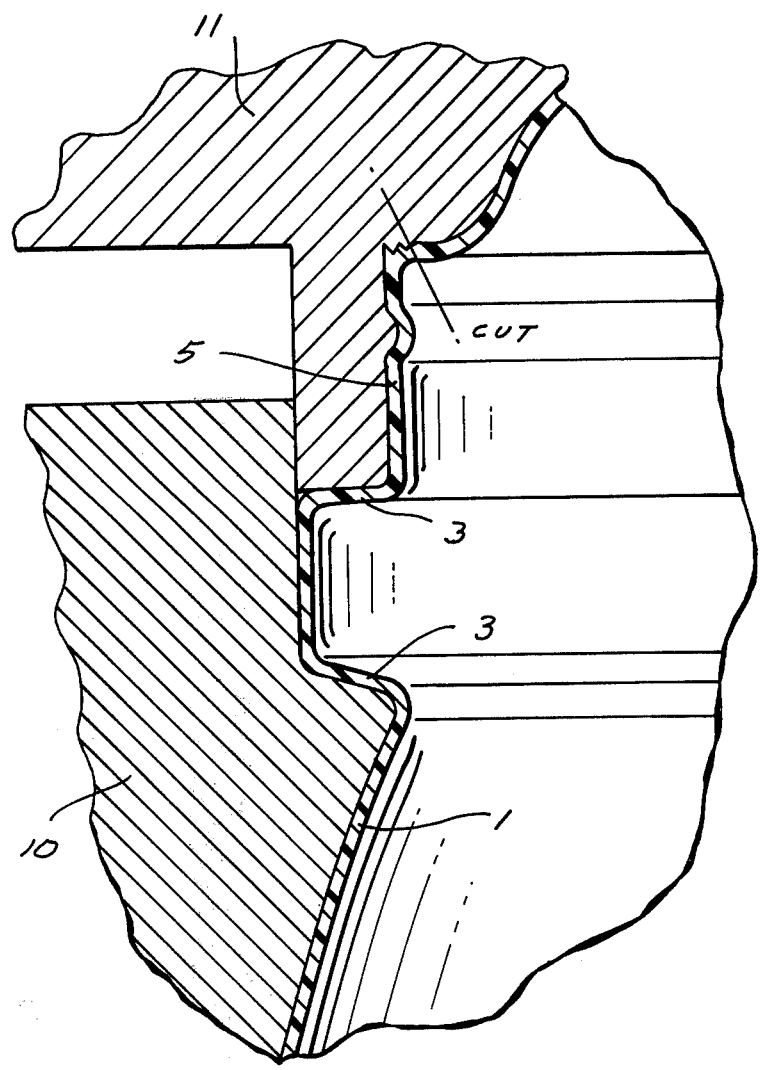
FIG. 2 is a diagrammatic illustration of the container performed in the mode of the present invention.

FIG. 2 illustrates the situation immediately after the blow-molding operation, that is, when the blank has been expanded to form a container preform. Incidentally, this container preform basically corresponds in shape to the prior-art container which has been discussed previously.

Figure 3:
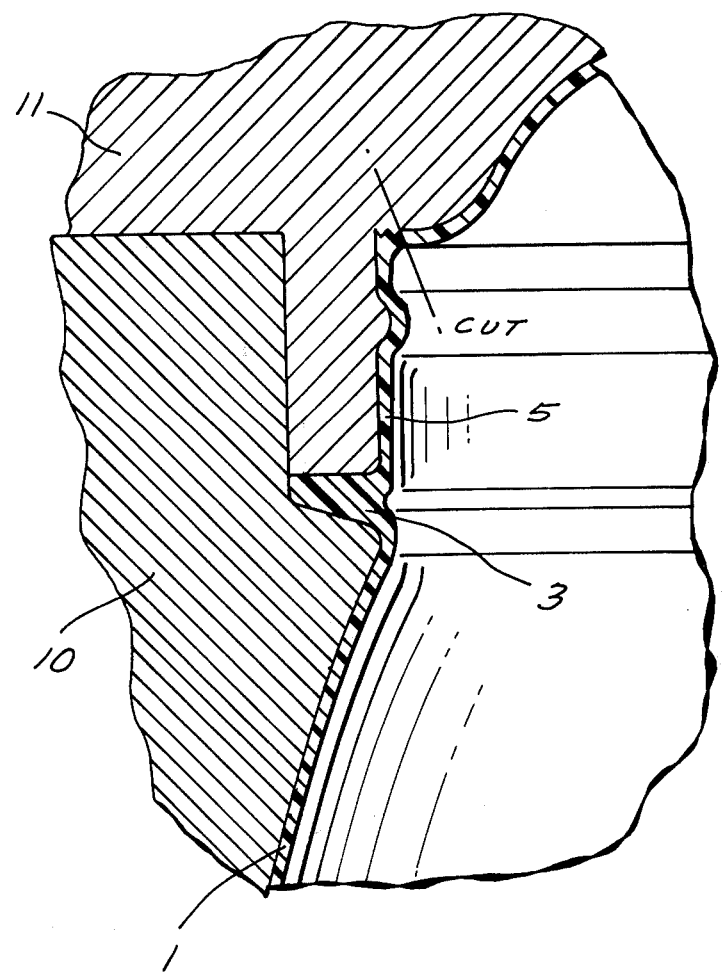
FIG. 3 illustrates, in a diagrammatic fashion, a further stage of manufacture of the container of FIG. 1.

After the termination of the blow-molding operation, but preferably while the material of the preform is still in a flowable state, the mold element 11 is displaced downwardly into the mold element 10, whereby the intermediate portion of the container, including two radially outwardly extending sections and an axial connecting section, are pressed against one another in the axial direction of the mold until finally another situation illustrated in FIG. 3 is reached in which the above-mentioned sections are fused with one another to form a solid unitary flange 3.

As illustrated in FIGS. 2 and 3, the container preform includes some excessive material at the region where the opening of the neck is to be, such excessive material being removed during the trimming operation by means of which the ready-to-use container is obtained which can then be assembled with the lid 2.

It will be understood that each of the elements described above, or two or more together, may also find a useful application in other types of constructions differing from the types described above.

While the invention has been illustrated and described as embodied in a blow-molded container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A container, comprising in combination a container body including an upper wall portion having a predetermined thickness and comprising an upwardly converging section and a substantially upright section above the converging section and with which the converging section is unitarily integrated; a neck portion axially spaced from said upper wall portion and having substantially said predetermined wall thickness; a first radially outwardly extending flange unitarily integrated with the substantially upright section of said upper wall portion of said container and with said neck portion, said first flange having an upper surface and an axial thickness which is equal to substantially twice the thickness of said predetermined thickness; a lid comprising an external wall surrounding said neck portion and which includes a second radially outwardly extending flange having a lower surface abutting against the upper surface of said first flange, said external wall being circumferentially complete so as to insure a uniform distribution of load applied to said wall and resulting from forces acting axially upon said container; and an annular connecting element operative for urging said first and second flanges together into alignment in the axial direction of the container and for uniformly clasping the flanges to thereby eliminate undesirable local deformation of said element due to the same forces and thus to insure permanent sealing closure of the container by said lid.

2. A container as defined in claim 1, said container body having an axis of symmetry and said neck portion being coaxial with said container body, said neck portion having an undulated configuration in the axial direction of the container.

3. A container as defined in claim 1, said first and second flanges each being circumferential; and further comprising an annular connecting element adapted to clasp said first and second flanges and to urge the same together and into alignment in the axial direction of the container.

4. A container as defined in claim 1, said lid further comprising an internal wall receivable within said neck portion, and a transverse wall extending substantially normal to said internal and external walls and interconnecting the same to thereby form an annular channel therewith.

5. A container as defined in claim 1, wherein said neck portion has a corrugated upper end face; and further comprising an annular sealing element receivable in said channel so as to sealingly contact said neck portion when engaging the corrugated upper end face and said lid to thereby seal the interface between said neck portion and said lid.

6. A container as defined in claim 1, said first flange being above the substantially upright section and being below said neck portion.

* * * * *